(12) United States Patent
Moritomo et al.

(10) Patent No.: US 10,234,032 B2
(45) Date of Patent: Mar. 19, 2019

(54) CONTROL SYSTEM FOR VEHICLE TRANSMISSION

(71) Applicant: Toyota Jidosha Kabushiki Kaisha, Toyota-shi Aichi-ken (JP)

(72) Inventors: Susumu Moritomo, Toyota (JP); Makoto Sawada, Nissin (JP); Keita Sasaki, Komaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 38 days.

(21) Appl. No.: 15/641,767

(22) Filed: Jul. 5, 2017

(65) Prior Publication Data
US 2018/0010687 A1 Jan. 11, 2018

(30) Foreign Application Priority Data
Jul. 7, 2016 (JP) .................... 2016-135501

(51) Int. Cl.
| F16H 61/70 | (2006.01) |
| F16H 37/08 | (2006.01) |
| F16H 61/662 | (2006.01) |
| F16H 37/02 | (2006.01) |

(52) U.S. Cl.
CPC ......... *F16H 61/702* (2013.01); *F16H 37/022* (2013.01); *F16H 37/0846* (2013.01); *F16H 61/662* (2013.01); *F16H 61/66272* (2013.01)

(58) Field of Classification Search
CPC ............ F16H 61/66272; F16H 61/702; B60W 10/02; B60W 10/101; B60W 10/107
See application file for complete search history.

(56) References Cited

U.S. PATENT DOCUMENTS

| 2003/0150683 A1* | 8/2003 | Hoshiya ............... F16D 48/066 192/3.57 |
| 2011/0053718 A1 | 3/2011 | Nonomura et al. |
| 2015/0316147 A1 | 11/2015 | Aoki |

(Continued)

FOREIGN PATENT DOCUMENTS

| CN | 104769333 A | 7/2015 |
| JP | 2011-047459 A | 3/2011 |
| WO | 2014/162563 A1 | 10/2014 |

OTHER PUBLICATIONS

U.S. Appl. No. 15/432,231, filed Feb. 14, 2017 Inventors: Keigo Matsubara, Ayumu Sagawa.

*Primary Examiner* — Edwin A Young
(74) *Attorney, Agent, or Firm* — Dinsmore & Shohl LLP

(57) ABSTRACT

A control system for a vehicle transmission is provided. The control system includes an electronic control unit. The electronic control unit is configured to, when control for engaging the at least one engaging device that switches power transmission to power transmission via a first power transmission mechanism and control for increasing hydraulic pressure that is applied to a continuously variable transmission are required, control the continuously variable transmission and the at least one engaging device so as to start control for engaging the at least one engaging device first and, after a lapse of a predetermined time from the start of control for engaging the at least one engaging device, start control for increasing hydraulic pressure that is applied to the continuously variable transmission.

5 Claims, 6 Drawing Sheets

(56) References Cited

U.S. PATENT DOCUMENTS

2016/0017994 A1* 1/2016 Suzumura ......... F16H 61/66272
  701/55
2016/0047470 A1* 2/2016 Aoki ................. F16H 61/66272
  474/28
2016/0052522 A1   2/2016 Matsuo et al.

* cited by examiner

CONTROL SYSTEM FOR VEHICLE TRANSMISSION

CROSS REFERENCE TO RELATED APPLICATIONS

The present disclosure claims priority to Japanese Patent Application No. 2016-135501 filed on Jul. 7, 2016 which is incorporated herein by reference in its entirety including the specification, drawings and abstract.

BACKGROUND

1. Technical Field

The present disclosure relates to control over a vehicle transmission including a first power transmission mechanism and a second power transmission mechanism that are provided in parallel with each other between a drive source and a drive wheel.

2. Description of Related Art

There is known a vehicle transmission including a first power transmission mechanism and a second power transmission mechanism. The first power transmission mechanism includes an engaging device that is controlled by hydraulic pressure. The second power transmission mechanism includes a continuously variable transmission mechanism that is controlled by hydraulic pressure. This is a vehicle transmission described in Japanese Patent Application Publication No. 2011-47459 (JP 2011-47459 A). The vehicle transmission described in JP 2011-47459 A includes a continuously variable transmission mechanism (second power transmission mechanism) and an auxiliary transmission mechanism (first power transmission mechanism) that are provided in series with each other between an engine and drive wheels. JP 2011-47459 A also describes that, at the time when the auxiliary transmission mechanism is shifted while hydraulic pressure is supplied to hydraulic actuators of the continuously variable transmission mechanism, inertia torque that is input from the auxiliary transmission mechanism to the continuously variable transmission mechanism is estimated and hydraulic pressure to be supplied to the continuously variable transmission mechanism is determined on the basis of a larger one of the inertia torque and the input torque that is input from the engine to the continuously variable transmission mechanism. When the continuously variable transmission mechanism is controlled as described above, belt slip due to insufficient belt clamping pressures is reduced.

SUMMARY

When the continuously variable transmission mechanism and the auxiliary transmission mechanism are provided in series with each other, maximum torque along the power transmission path is considered, and it is possible to control hydraulic pressure supplied to the continuously variable transmission mechanism on the basis of the maximum torque. On the other hand, when the continuously variable transmission mechanism and the auxiliary transmission mechanism are provided in parallel with each other, it is required to control hydraulic pressure to be supplied on the basis of the total value of input torque that is input to the continuously variable transmission mechanism and inertia torque from the auxiliary transmission mechanism, so large hydraulic pressure is required. If hydraulic pressure control over the continuously variable transmission mechanism and hydraulic pressure control over the auxiliary transmission mechanism are simultaneously started in such a situation, hydraulic pressure for the auxiliary transmission mechanism and hydraulic pressure for the continuously variable transmission mechanism, which includes inertia torque caused by a variation in the rotation of the auxiliary transmission mechanism, are required at the same time. Depending on the maximum output capacity of a hydraulic pressure supply source or an oil temperature, required hydraulic pressure may not be sufficiently supplied. For example, when the continuously variable transmission mechanism is a belt-type continuously variable transmission mechanism, belt slip due to a decrease in hydraulic pressure may occur.

The present disclosure provides a control system that is able to reduce occurrence of a decrease in hydraulic pressure in a vehicle transmission including a first power transmission mechanism and a second power transmission mechanism that are provided in parallel with each other between a drive source and a drive wheel.

An aspect of the present disclosure provides a control system for a vehicle transmission. The vehicle transmission includes a first power transmission mechanism and a second power transmission mechanism that are provided in parallel with each other between a drive source and a drive wheel. The second power transmission mechanism includes a continuously variable transmission that is controlled by hydraulic pressure. The vehicle transmission includes at least one engaging device that is controlled by hydraulic pressure and that switches power transmission to power transmission via the first power transmission mechanism. The control system includes an electronic control unit. The electronic control unit is configured to, when control for engaging the at least one engaging device that switches power transmission to power transmission via the first power transmission mechanism and control for increasing hydraulic pressure that is applied to the continuously variable transmission are required, control the continuously variable transmission and the at least one engaging device so as to start control for engaging the at least one engaging device first and, after a lapse of a predetermined time from the start of control for engaging the at least one engaging device, start control for increasing hydraulic pressure that is applied to the continuously variable transmission.

With the control system according to this aspect, the timing of starting control for engaging the at least one engaging device and the timing of starting control for increasing hydraulic pressure that is applied to the continuously variable transmission do not completely overlap with each other. Therefore, consumption of a large amount of hydraulic oil at a time is suppressed, with the result that it is possible to suppress a decrease in hydraulic pressure due to an insufficient flow rate of hydraulic oil. Control for increasing hydraulic pressure that is applied to the continuously variable transmission is started after a lapse of the predetermined time; however, since control for engaging the at least one engaging device is already being executed, a flow rate to be consumed is smaller as compared to the case where control for engaging the at least one engaging device and control for increasing hydraulic pressure that is applied to the continuously variable transmission are simultaneously started. Therefore, a decrease in hydraulic pressure is suppressed because an insufficient flow rate is less likely to occur, so it is possible to ensure hydraulic pressure that is required at the time of control for increasing hydraulic pressure that is applied to the continuously variable transmission. In addition, when the continuously variable transmission is a belt-type continuously variable transmission, it is possible to reduce belt slip due to a decrease in hydraulic pressure.

In the control system according to the above aspect, the at least one engaging device may be configured to be able to switch power transmission between the drive source and the drive wheel to any one of power transmission via the first power transmission mechanism and power transmission via the second power transmission mechanism.

With the control system according to this aspect, power transmission is switched between power transmission via the first power transmission mechanism and power transmission via the second power transmission mechanism by executing control for engaging the at least one engaging device. In executing control for engaging the at least one engaging device, control for increasing hydraulic pressure that is applied to the continuously variable transmission is started after a lapse of the predetermined time from the start of control for engaging the at least one engaging device. Therefore, the start of control for increasing hydraulic pressure that is applied to the continuously variable transmission and the start of control for engaging the engaging device do not overlap with each other. Therefore, at the time of switching power transmission, occurrence of an insufficient flow rate of hydraulic oil is suppressed, and, at the time of control for increasing hydraulic pressure that is applied to the continuously variable transmission, a decrease in hydraulic pressure due to an insufficient flow rate is suppressed.

In the control system according to the above aspect, the at least one engaging device may include a first engaging device and a second engaging device. The first engaging device and the second engaging device may be configured to switch power transmission to power transmission via the first power transmission mechanism when the first engaging device is engaged and the second engaging device is released, and may be configured to switch power transmission to power transmission via the second power transmission mechanism when the second engaging device is engaged and the first engaging device is released.

With the control system according to this aspect, when power transmission is switched between power transmission via the first power transmission mechanism and power transmission via the second power transmission mechanism by the first engaging device and the second engaging device, control for increasing hydraulic pressure that is applied to the continuously variable transmission is started after a lapse of the predetermined time from the start of control for engaging the at least one engaging device. Therefore, the start of control for increasing hydraulic pressure that is applied to the continuously variable transmission and the start of control for engaging the at least one engaging device do not overlap with each other. As a result, occurrence of an insufficient flow rate of hydraulic oil is prevented, and a decrease in hydraulic pressure due to an insufficient flow rate is suppressed at the time of control for increasing hydraulic pressure that is applied to the continuously variable transmission.

In the control system according to the above aspect, the at least one engaging device each may include an engagement element and a piston that presses the engagement element. The predetermined time may be set to a time corresponding to a time that is taken from the start of control for engaging the at least one engaging device to when the piston reaches a position just before the piston presses the engagement element.

With the control system according to this aspect, a flow rate that is required in order to quickly move the piston to a position just before the piston presses the engagement element increases at the initial stage of the start of control for engaging the at least one engaging device; however, since control for increasing hydraulic pressure that is applied to the continuously variable transmission is not started at this time, an insufficient flow rate of hydraulic oil is suppressed. In addition, since the piston does not press the engagement element until the predetermined time elapses, inertia torque caused by a variation in the rotation of the first power transmission mechanism resulting from control for engaging the at least one engaging device is not input to the continuously variable transmission. Therefore, even when control for increasing hydraulic pressure that is applied to the continuously variable transmission is not executed until a lapse of the predetermined time, torque fluctuations caused by inertia torque input to the continuously variable transmission do not occur. On the other hand, control for increasing hydraulic pressure that is applied to the continuously variable transmission is started after a lapse of the predetermined time. Since the start of control for increasing hydraulic pressure that is applied to the continuously variable transmission does not overlap with the start of control for engaging the at least one engaging device, an insufficient flow rate is hard to occur. Therefore, at the time of control for increasing hydraulic pressure that is applied to the continuously variable transmission, a decrease in hydraulic pressure due to an insufficient flow rate is suppressed.

In the control system according to the above aspect, the electronic control unit may be configured to, as a variation in rotation of the first power transmission mechanism resulting from control for engaging the at least one engaging device ends, end control for increasing hydraulic pressure that is applied to the continuously variable transmission.

With the control system according to this aspect, as a variation in the rotation of the first power transmission mechanism resulting from control for engaging the at least one engaging device ends, inertia torque caused by a variation in rotation is not input to the continuously variable transmission. Therefore, as a variation in the rotation of the first power transmission mechanism ends, unnecessary supply of hydraulic pressure is eliminated by ending control for increasing hydraulic pressure that is applied to the continuously variable transmission, so fuel consumption improves.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described in detail with reference to the accompanying drawings. In the following embodiment, the drawings are simplified or modified where appropriate, and the scale ratio, shape, and the like, of each portion are not always accurately drawn.

Figure 1:
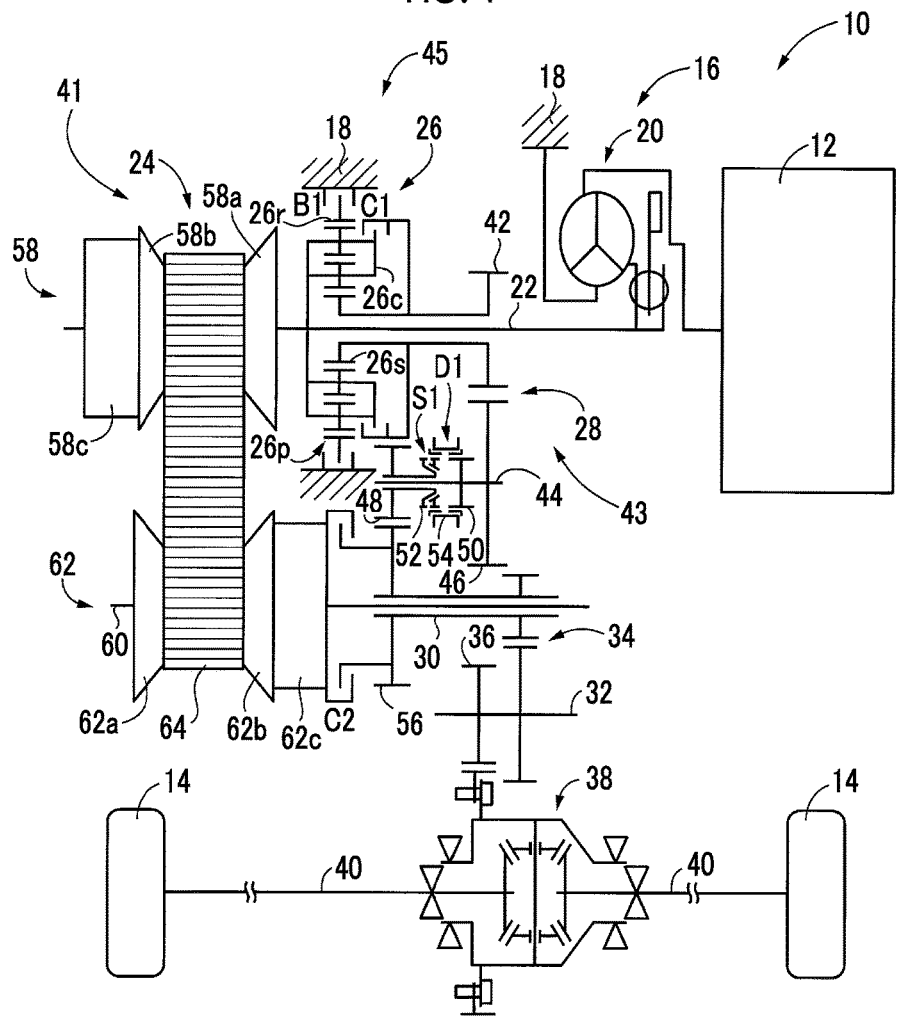
FIG. 1 is a view that illustrates the schematic configuration of a vehicle to which the present disclosure is applied.

FIG. 1 is a view that illustrates the schematic configuration of a vehicle 10 to which the present disclosure is applied. As shown in FIG. 1, the vehicle 10 includes an engine 12, drive wheels 14 and a power transmission device 16. The engine 12 functions as a drive source for propelling the vehicle 10. The power transmission device 16 is provided between the engine 12 and the drive wheels 14. The power transmission device 16 includes a known torque converter 20, an input shaft 22, a known belt-type continuously variable transmission 24 (hereinafter, referred to as continuously variable transmission 24), a forward/reverse switching device 26, a gear mechanism 28, an output shaft 30, a counter shaft 32, a reduction gear device 34, a differential gear 38, a pair of axles 40, and the like, inside a housing 18. The housing 18 serves as a non-rotating member. The torque converter 20 serves as a fluid transmission device coupled to the engine 12. The input shaft 22 is provided integrally with a turbine shaft. The turbine shaft is the output rotating member of the torque converter 20. The continuously variable transmission 24 serves as a continuously variable transmission mechanism coupled to the input shaft 22. The forward/reverse switching device 26 is similarly coupled to the input shaft 22. The gear mechanism 28 is coupled to the input shaft 22 via the forward/reverse switching device 26, and serves as a gear transmission mechanism provided in parallel with the continuously variable transmission 24. The output shaft 30 is the common output rotating member of both the continuously variable transmission 24 and gear mechanism 28. The reduction gear device 34 consists of a pair of gears. The pair of gears are respectively provided on the output shaft 30 and the counter shaft 32 so as to be relatively non-rotatable, and are in mesh with each other. The differential gear 36 is coupled to a gear 36. The gear 36 is provided on the counter shaft 32 so as to be relatively non-rotatable. The pair of axles 40 are coupled to the differential gear 38. In the thus configured power transmission device 16, the power (which is synonymous with torque or force unless specifically distinguished) of the engine 12 is transmitted to the pair of drive wheels 14 sequentially via the torque converter 20, the continuously variable transmission 24 (or the forward/reverse switching device 26 and the gear mechanism 28), the reduction gear device 34, the differential gear 38, the axles 40, and the like.

In this way, the power transmission device 16 includes the continuously variable transmission 24 and the gear mechanism 28. The continuously variable transmission 24 and the gear mechanism 28 are provided in parallel with each other in the power transmission path between the engine 12 (which is synonymous with the input shaft 22 that serves as an input rotating member to which the power of the engine 12 is transmitted) and the drive wheels 14 (which are synonymous with the output shaft 30 that serves as the output rotating member that outputs the power of the engine 12 to the drive wheels 14). Thus, the power transmission device 16 includes a first power transmission mechanism 43 and a second power transmission mechanism 41 in parallel with each other, and is configured to change the power transmission path between a first power transmission path and a second power transmission path in response to the traveling state of the vehicle 10. The first power transmission mechanism 43 establishes the first power transmission path. The second power transmission mechanism 41 establishes the second power transmission path. The first power transmission path transmits the power of the engine 12 from the input shaft 22 to the drive wheel 14 side (that is, the output shaft 30) via the forward/reverse switching device 26 and the gear mechanism 28. The second power transmission path transmits the power of the engine 12 from the input shaft 22 to the drive wheel 14 side (that is, the output shaft 30) via the continuously variable transmission 24. For this reason, the power transmission device 16 includes a forward clutch C1, a reverse brake B1 and a CVT drive clutch C2 as engaging devices for switching power transmission to any one of power transmission via the first power transmission mechanism 43 and power transmission via the second power transmission mechanism 41. The forward clutch C1 and the reverse brake B1 each serve as a first engaging device that allows or interrupts power transmission via the first power transmission path (that is, the first engaging device switches power transmission to power transmission via the first power transmission mechanism 43). The CVT drive clutch C2 serves as a second engaging device that allows or interrupts power transmission via the second power transmission path (that is, the second engaging device switches power transmission to power transmission via the second power transmission mechanism 41). A vehicle transmission 45 is provided by arranging the first power transmission mechanism 43 and the second power transmission mechanism 41 in parallel with each other.

The CVT drive clutch C2, the forward clutch C1 and the reverse brake B1 correspond to the engaging devices. Each of the CVT drive clutch C2, the forward clutch C1 and the reverse brake B1 is a known hydraulic friction engaging device (friction clutch) that is frictionally engaged by a hydraulic actuator. That is, a piston that is moved by the hydraulic actuator presses a friction engagement element formed of a plurality of friction members, with the result that the friction clutch is frictionally engaged. The friction clutch is a known technique, so the detailed description is omitted. As will be described later, each of the forward clutch C1 and the reverse brake B1 is one of elements that constitute the forward/reverse switching device 26.

The forward/reverse switching device 26 is provided around the input shaft 22 coaxially with the input shaft 22. The forward/reverse switching device 26 mainly includes a double pinion-type planetary gear train 26p, the forward clutch C1 and the reverse brake B1. A carrier 26c of the planetary gear train 26p is integrally coupled to the input shaft 22. A ring gear 26r of the planetary gear train 26p is selectively coupled to the housing 18 via the reverse brake B1. A sun gear 26s of the planetary gear train 26p is coupled to a small-diameter gear 42. The small-diameter gear 42 is provided around the input shaft 22 coaxially with the input shaft 22 so as to be relatively rotatable. The carrier 26c and the sun gear 26s are selectively coupled to each other via the forward clutch C1. In the thus configured forward/reverse switching device 26, when the forward clutch C1 is engaged and the reverse brake B1 is released, the input shaft 22 is directly coupled to the small-diameter gear 42, with the result that a forward power transmission path is established in the first power transmission mechanism 43. When the reverse brake B1 is engaged and the forward clutch C1 is released, the small-diameter gear 42 is rotated in the direction opposite to the rotation direction of the input shaft 22, with the result that a reverse power transmission path is established in the first power transmission mechanism 43. When both the forward clutch C1 and the reverse brake B1 are released, the first power transmission mechanism 43 is placed in a neutral state (power transmission interrupted state) where power transmission is interrupted.

The gear mechanism 28 includes the small-diameter gear 42 and a large-diameter gear 46. The large-diameter gear 46 is provided so as to be relatively non-rotatable with respect to a gear mechanism counter shaft 44. The large-diameter gear 46 is in mesh with the small-diameter gear 42. Therefore, the gear mechanism 28 is a power transmission mechanism in which one gear position (gear ratio) is established. An idler gear 48 is provided around the gear mechanism counter shaft 44 coaxially with the gear mechanism counter shaft 44 so as to be relatively rotatable. A dog clutch D1 is further provided around the gear mechanism counter shaft 44 between the gear mechanism counter shaft 44 and the idler gear 48. The dog clutch D1 selectively connects the gear mechanism counter shaft 44 to the idler gear 48 or disconnects the gear mechanism counter shaft 44 from the idler gear 48. Therefore, the dog clutch D1 functions as a clutch mechanism that allows or interrupts power transmission in the first power transmission mechanism 43 provided in the power transmission device 16.

Specifically, the dog clutch D1 includes a first gear 50, a second gear 52 and a hub sleeve 54. The first gear 50 is provided on the gear mechanism counter shaft 44. The second gear 52 is provided on the idler gear 48. The hub sleeve 54 has internal teeth that are fittable to (engageable or meshable with) these first gear 50 and second gear 52. In the thus configured dog clutch D1, when the hub sleeve 54 is fitted to these first gear 50 and second gear 52, the gear mechanism counter shaft 44 and the idler gear 48 are connected to each other. The dog clutch D1 further includes a known synchromesh mechanism S1 as a synchronization mechanism. The synchromesh mechanism S1 synchronizes rotation at the time when the hub sleeve 54 is fitted to the first gear 50 and the second gear 52. The idler gear 48 is in mesh with an output gear 56 having a larger diameter than the idler gear 48. The output gear 56 is provided around the same rotation axis as the output shaft 30 so as to be relatively non-rotatable with respect to the output shaft 30. When one of the forward clutch C1 and the reverse brake B1 is engaged and the dog clutch D1 is engaged, the first power transmission path is established. The first power transmission path transmits the power of the engine 12 from the input shaft 22 to the output shaft 30 sequentially via the forward/reverse switching device 26, the gear mechanism 28, the idler gear 48 and the output gear 56. Thus, the first power transmission mechanism 43 includes the forward/reverse switching device 26 (including the forward clutch C1 and the reverse brake B1), the gear mechanism 28, the idler gear 48 and the output gear 56. In the present embodiment, the CVT drive clutch C2 does not directly contribute to power transmission in the first power transmission mechanism 43; however, the CVT drive clutch C2 is included in the first power transmission mechanism 43 as a matter of convenience. The forward clutch C1 and the CVT drive clutch C2 correspond to an engaging device according to the present disclosure.

The continuously variable transmission 24 is provided in the power transmission path between the input shaft 22 and the output shaft 30. The continuously variable transmission 24 is a well-known push-belt continuously variable transmission. The continuously variable transmission 24 includes a primary pulley 58, a secondary pulley 62 and a transmission belt 64. The primary pulley 58 has a variable effective diameter, and is provided on the input shaft 22. The secondary pulley 62 has a variable effective diameter, and is provided on a rotary shaft 60 coaxial with the output shaft 30. The transmission belt 64 is wound so as to span between the pair of variable pulleys 58, 62. Power is transmitted via friction force between the pair of variable pulleys 58, 62 and the transmission belt 64.

The primary pulley 58 includes a fixed sheave 58a, a movable sheave 58b and a primary hydraulic actuator 58c (hereinafter, referred to as hydraulic actuator 58c). The fixed sheave 58a serves as an input-side fixed rotor, and is coaxially connected to the input shaft 22. The movable sheave 58b serves as an input-side movable rotor. The movable sheave 58b is provided so as to be relatively non-rotatable around its axis and movable in the axial direction with respect to the input shaft 22. The primary hydraulic actuator 58c generates thrust for moving the movable sheave 58b in order to change the V-groove width between the fixed sheave 58a and the movable sheave 58b.

The secondary pulley 62 includes a fixed sheave 62a, a movable sheave 62b and a secondary hydraulic actuator 62c (hereinafter, referred to as hydraulic actuator 62c). The fixed sheave 62a serves as an output-side fixed rotor. The movable sheave 62b serves as an output-side movable rotor. The movable sheave 62b is provided so as to be relatively non-rotatable around its axis and movable in the axial direction with respect to the fixed sheave 62a. The hydraulic actuator 62c generates thrust for moving the movable sheave 62b in order to change the V-groove width between the fixed sheave 62a and the movable sheave 62b.

In the continuously variable transmission 24, when the winding diameters (effective diameters) of the transmission belt 64 are changed as a result of a change in the V-groove width of each of the pair of movable pulleys 58, 62, a speed ratio (gear ratio)γ(=Input shaft rotation speed Nin/output shaft rotation speed Nout) is continuously varied. For example, when the V-groove width of the primary pulley 58 is narrowed, the gear ratio γ is reduced (that is, the continuously variable transmission 24 is upshifted). When the V-groove width of the primary pulley 58 is widened, the gear ratio γ is increased (that is, the continuously variable transmission 24 is downshifted). The output shaft 30 is arranged around the rotary shaft 60 coaxially with the rotary shaft 60 so as to be relatively rotatable. The CVT drive clutch C2 is provided on the drive wheel 14 side with respect to the continuously variable transmission 24 (that is, the CVT drive clutch C2 is provided between the secondary pulley 62 and the drive wheels 14 (output shaft 30)). The CVT drive clutch C2 selectively connects the secondary pulley 62 to the output shaft 30 (drive wheels 14) or disconnects the secondary pulley 62 from the output shaft 30 (drive wheels 14). When the CVT drive clutch C2 is engaged, the second power transmission path is established. The second power transmission path transmits the power of the engine 12 from the input shaft 22 to the output shaft 30 via the continuously variable transmission 24. Therefore, the second power transmission mechanism 41 includes the continuously variable transmission 24.

Figure 2:
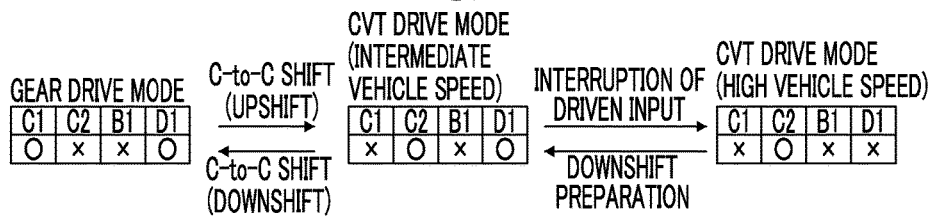
FIG. 2 is a view for illustrating changes of a driving pattern of a power transmission device shown in FIG. 1 by using an engagement chart of engagement elements in each driving pattern.

The operation of the power transmission device 16 will be described below. FIG. 2 is a view for illustrating changes of a driving pattern of the power transmission device 16 by using an engagement chart of the engagement elements in each driving pattern. In FIG. 2, C1 corresponds to the operation state of the forward clutch C1, C2 corresponds to the operation state of the CVT drive clutch C2, B1 corresponds to the operation state of the reverse brake B1, D1 corresponds to the operation state of the dog clutch D1, circle mark indicates an engaged (connected) state, and cross mark indicates a released (disconnected) state.

Initially, a gear drive mode that is the driving pattern in which the power of the engine 12 is transmitted to the output shaft 30 via the first power transmission mechanism 43 will be described. In the gear drive mode, as shown in FIG. 2, for example, the forward clutch C1 and the dog clutch D1 are engaged, and the CVT drive clutch C2 and the reverse brake B1 are released.

Specifically, when the forward clutch C1 is engaged, the planetary gear train 26p that constitutes the forward/reverse switching device 26 is integrally rotated, so the small-diameter gear 42 is rotated at the same rotation speed as the input shaft 22. Since the small-diameter gear 42 is in mesh with the large-diameter gear 46 provided on the gear mechanism counter shaft 44, the gear mechanism counter shaft 44 is also similarly rotated. In addition, since the dog clutch D1 is engaged, the gear mechanism counter shaft 44 and the idler gear 48 are connected to each other. Since the idler gear 48 is in mesh with the output gear 56, the output shaft 30 integrally provided with the output gear 56 is rotated. In this way, when the forward clutch C1 and the dog clutch D1 are engaged, the power of the engine 12 is transmitted to the output shaft 30 sequentially via the torque converter 20, the forward/reverse switching device 26, the gear mechanism 28, the idler gear 48, and the like. In the gear drive mode, for example, when the reverse brake B1 and the dog clutch D1 are engaged and the CVT drive clutch C2 and the forward clutch C1 are released, reverse traveling is enabled.

Next, a CVT drive mode that is the driving pattern in which the power of the engine 12 is transmitted to the output shaft 30 via the second power transmission mechanism 41 will be described. In the CVT drive mode, as shown in the CVT drive mode (high vehicle speed) of FIG. 2, for example, the CVT drive clutch C2 is engaged, and the forward clutch C1, the reverse brake B1 and the dog clutch D1 are released.

Specifically, when the CVT drive clutch C2 is engaged, the secondary pulley 62 and the output shaft 30 are connected to each other, so the secondary pulley 62 and the output shaft 30 are integrally rotated. In this way, when the CVT drive clutch C2 is engaged, the power of the engine 12 is transmitted to the output shaft 30 sequentially via the torque converter 20, the continuously variable transmission 24, and the like. The reason why the dog clutch D1 is released in the CVT drive mode (high vehicle speed) is to, for example, eliminate a drag of the gear mechanism 28, and the like, in the CVT drive mode and prevent high-speed rotation of the gear mechanism 28, and the like, at a high vehicle speed.

The gear drive mode is, for example, selected in a low vehicle speed region including a stopped state of the vehicle 10. A gear ratio γ1 of the first power transmission mechanism 43 (that is, a gear ratio EL that is established by the gear mechanism 28) is set to a value larger than (a gear ratio lower than) the maximum gear ratio (that is, the lowest gear ratio that is the lowest vehicle speed-side gear ratio) γmax that is established by the continuously variable transmission 24. For example, the gear ratio γ1 corresponds to a first-speed gear ratio γ1 that is the gear ratio of a first-speed gear position in the power transmission device 16, and the lowest gear ratio γmax of the continuously variable transmission 24 corresponds to a second-speed gear ratio γ2 that is the gear ratio of a second-speed gear position in the power transmission device 16. For this reason, the gear drive mode and the CVT drive mode are changed in accordance with, for example, a shift line for changing the gear position between the first-speed gear position and the second-speed gear position in a shift map of a known stepped transmission. For example, in the CVT drive mode, a shift to change the gear ratio γ (for example, CVT shift, continuously variable shift) is carried out on the basis of a traveling state, such as an accelerator operation amount θacc and a vehicle speed V, by using a known technique. In changing the driving pattern from the gear drive mode to the CVT drive mode (high vehicle speed) or changing the driving pattern from the CVT drive mode (high vehicle speed) to the gear drive mode, the driving pattern is changed after transitionally passing through a CVT drive mode (intermediate vehicle speed).

For example, when the driving pattern is changed from the gear drive mode to the CVT drive mode (high vehicle speed), the driving pattern is transitionally changed from the state where the forward clutch C1 and the dog clutch D1 are engaged, which is the state corresponding to the gear drive mode, to the CVT drive mode (intermediate vehicle speed) that is the state where the CVT drive clutch C2 and the dog clutch D1 are engaged. That is, a clutch engagement changing stepped shift (for example, clutch-to-clutch shift (hereinafter, referred to as C-to-C shift)) is carried out so as to release the forward clutch C1 and engage the CVT drive clutch C2. At this time, the power transmission path is changed from the first power transmission path to the second power transmission path, so the power transmission device 16 is substantially upshifted. After the power transmission path has been changed, the dog clutch D1 is released in order to prevent unnecessary drag, high-speed rotation of the gear mechanism 28, and the like (see interruption of driven input in FIG. 2). In this way, the dog clutch D1 functions as a driven input interruption clutch that interrupts input from the drive wheel 14 side.

For example, when the driving pattern is changed from the CVT drive mode (high vehicle speed) to the gear drive mode, the driving pattern is transitionally changed from the state where the CVT drive clutch C2 is engaged to the CVT drive mode (intermediate vehicle speed) that is the state where the dog clutch D1 is further engaged in preparation for changing the driving pattern to the gear drive mode (see downshift preparation in FIG. 2). In the CVT drive mode (intermediate vehicle speed), rotation is also transmitted to the sun gear 26s of the planetary gear train 26p via the gear mechanism 28. When a clutch engagement changing stepped shift (for example, C-to-C shift) is carried out so as to release the CVT drive clutch C2 and engage the forward clutch C1 from the state of the CVT drive mode (intermediate vehicle speed), the driving pattern is changed to the gear drive mode. At this time, the power transmission path is changed from the second power transmission path to the first power transmission path, so the power transmission device 16 is substantially downshifted.

Figure 3:
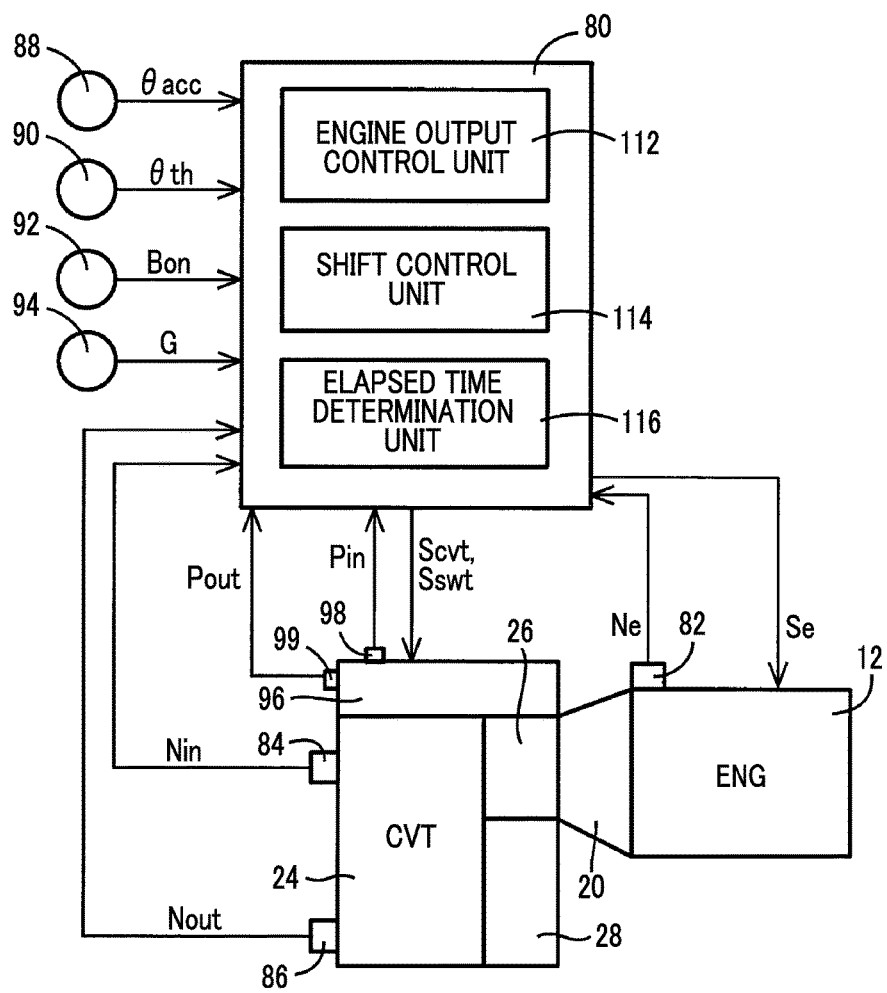
FIG. 3 is a view that illustrates a relevant portion of control functions and control system for various controls in the vehicle shown in FIG. 1.

FIG. 3 is a view that illustrates a relevant portion of control functions and control system for various controls in the vehicle 10. As shown in FIG. 3, the vehicle 10 includes, for example, an electronic control unit 80 including a control system for the vehicle 10. The control system changes the driving pattern of the power transmission device 16. FIG. 3 is a view that shows an input/output system of the electronic control unit 80, and is a functional block diagram that illustrates a relevant portion of control functions that are implemented by the electronic control unit 80. The electronic control unit 80 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 80 is configured to execute output control over the engine 12, shift control and belt clamping pressure control over the continuously variable transmission 24, change control for changing the driving pattern to the CVT drive mode or the gear drive mode, and the like. Where necessary, the electronic control unit 80 is split into an electronic control unit for engine control, an electronic control unit for shift control, and the like.

Various actual values based on detection signals of various sensors of the vehicle 10 are supplied to the electronic control unit 80. The various sensors include, for example, an engine rotation speed sensor 82, an input shaft rotation speed sensor 84, an output shaft rotation speed sensor 86, an accelerator operation amount sensor 88, a throttle valve opening degree sensor 90, a foot brake switch 92, a G sensor 94, hydraulic pressure sensors 98, 99, and the like. The various actual values include, for example, an engine rotation speed Ne, an input shaft rotation speed Nin, an output shaft rotation speed Nout, an accelerator operation amount θacc, a throttle opening degree θth, a brake on signal Bon, a longitudinal acceleration G of the vehicle 10, a primary pressure Pin, a secondary pressure Pout, and the like. The input shaft rotation speed Nin is the rotation speed of the primary pulley 58, and corresponds to a turbine rotation speed Nt. The output shaft rotation speed Nout is the rotation speed of the secondary pulley 62, and corresponds to a vehicle speed V. The accelerator operation amount θacc is an operation amount of an accelerator pedal as a driver's acceleration request amount. The brake on signal Bon is a signal that indicates the state where a foot brake that is a service brake has been operated. The primary pressure Pin is supplied to the hydraulic actuator 58c of the primary pulley 58. The secondary pressure Pout is supplied to the hydraulic actuator 62c of the secondary pulley 62.

An engine output control command signal Se, a hydraulic control command signal Scvt, a hydraulic control command signal Sswt, and the like, are output from the electronic control unit 80. The engine output control command signal Se is used to control the output of the engine 12. The hydraulic control command signal Scvt is used to control hydraulic pressure associated with a shift of the continuously variable transmission 24. The hydraulic control command signal Sswt is used to control the forward/reverse switching device 26, the CVT drive clutch C2 and the dog clutch D1 associated with a change of the driving pattern of the power transmission device 16. Specifically, a throttle signal, an injection signal, an ignition timing signal, and the like, are output as the engine output control command signal Se. The throttle signal is used to control the open/close of the electronic throttle valve by driving a throttle actuator. The injection signal is used to control the amount of fuel that is injected from a fuel injection device. The ignition timing signal is used to control the ignition timing of the engine 12 by an ignition device. A command signal for driving a solenoid valve that adjusts the primary pressure Pin that is supplied to the hydraulic actuator 58c of the primary pulley 58, a command signal for driving a solenoid valve that adjusts the secondary pressure Pout that is supplied to the hydraulic actuator 62c of the secondary pulley 62, and the like, are output to a hydraulic control circuit 96 as the hydraulic control command signal Scvt. Command signals for driving solenoid valves that control hydraulic pressures that are supplied to actuators, and the like, for actuating the forward clutch C1, the reverse brake B1, the CVT drive clutch C2 and the hub sleeve 54 are output to the hydraulic control circuit 96 as the hydraulic control command signal Sswt.

Figure 4:
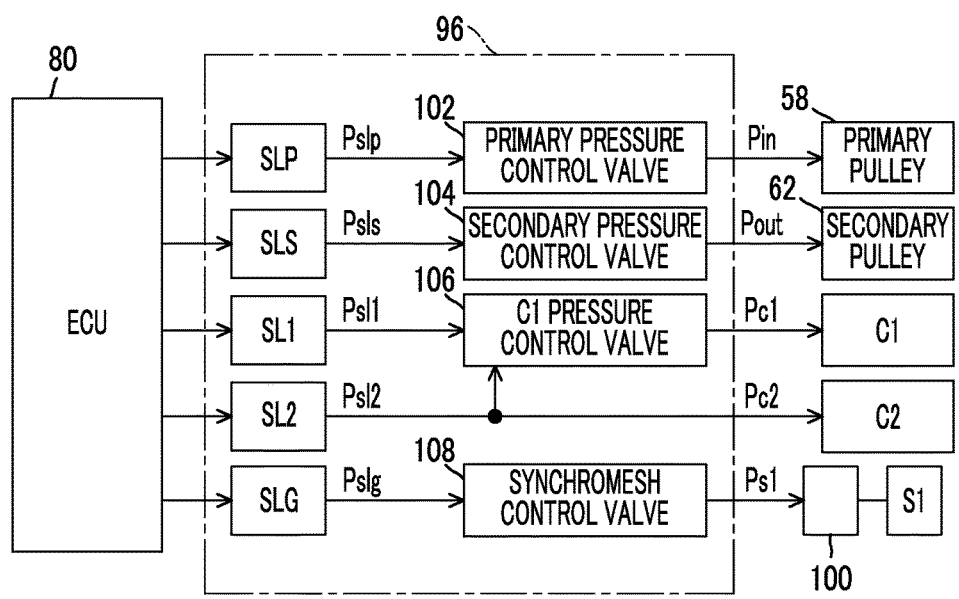
FIG. 4 is a view that illustrates portions that control hydraulic pressures associated with a continuously variable transmission, a forward clutch and a CVT drive clutch in a hydraulic control circuit provided in the power transmission device shown in FIG. 1.

FIG. 4 is a view that illustrates portions that control hydraulic pressures associated with the continuously variable transmission 24, the forward clutch C1, the CVT drive clutch C2 and the dog clutch D1 in the hydraulic control circuit 96 provided in the power transmission device 16. The hydraulic control circuit 96 includes a primary electromagnetic valve SLP, a secondary electromagnetic valve SLS, a C1 electromagnetic valve SL1, a C2 electromagnetic valve SL2 and a synchromesh electromagnetic valve SLG. The primary electromagnetic valve SLP is used to control the primary pressure Pin that is supplied to the primary pulley 58. The secondary electromagnetic valve SLS is used to control the secondary pressure Pout that is supplied to the secondary pulley 62. The C1 electromagnetic valve SL1 is used to control C1 pressure Pc1 that is supplied to the forward clutch C1. The C2 electromagnetic valve SL2 is used to control C2 pressure Pc2 that is supplied to the CVT drive clutch C2. The synchromesh electromagnetic valve SLG is used to control synchromesh control pressure PS1 that is supplied to the hydraulic actuator 100 that actuates the synchromesh mechanism S1. The hydraulic control circuit 96 includes a primary pressure control valve 102, a secondary pressure control valve 104, a C1 pressure control valve 106 and a synchromesh control valve 108.

Each of the electromagnetic valves SLP, SLS, SL1, SL2, SLG is a linear solenoid valve that is driven by a hydraulic control command signal (driving current) that is output from the electronic control unit 80. The primary pressure control valve 102 is operated on the basis of SLP pressure Pslp to regulate the primary pressure Pin. The SLP pressure Pslp is output from the primary electromagnetic valve SLP. The secondary pressure control valve 104 is operated on the basis of SLS pressure Psls to regulate the secondary pressure Pout. The SLS pressure Psls is output from the secondary electromagnetic valve SLS. The synchromesh control valve 108 is operated on the basis of SLG pressure Pslg to regulate the synchromesh control pressure Ps1. The SLG pressure Pslg is output from the synchromesh electromagnetic valve SLG. The C1 pressure control valve 106 switches to communicate or interrupt an oil passage through which SL1 pressure Psl1 is supplied to the forward clutch C1 as the C1 pressure Pc1. The SL1 pressure Psl1 is output from the C1 electromagnetic valve SL1. The C1 pressure control valve 106 functions as a fail-safe valve that avoids simultaneous engagement of the forward clutch C1 and the CVT drive clutch C2 by interrupting the oil passage through which the C1 pressure Pc1 (which is synonymous with the SL1 pressure Psl1) is supplied to the forward clutch C1. SL2 pressure Psl2 that is output from the C2 electromagnetic valve SL2 is directly supplied to the CVT drive clutch C2 as the C2 pressure Pc2.

Figure 5:
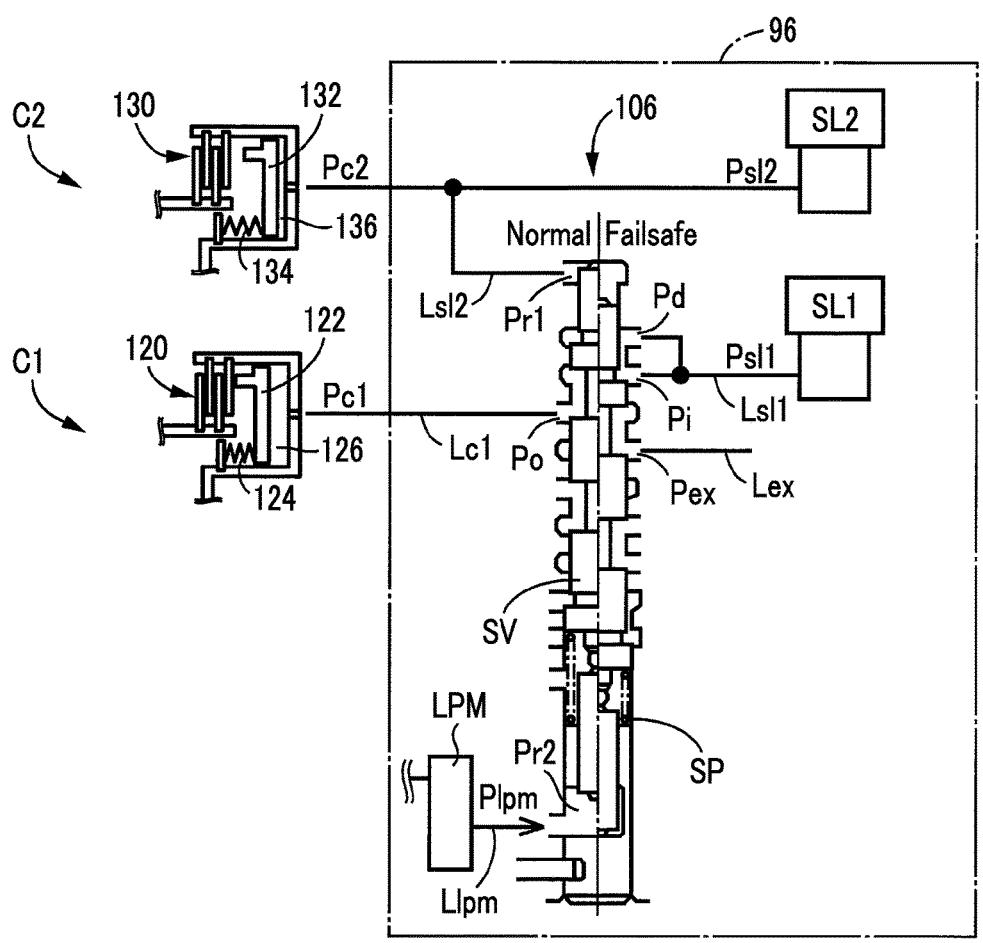
FIG. 5 is a view that illustrates the configuration of a C1 pressure control valve shown in FIG. 4.

FIG. 5 is a view that illustrates the configuration of the C1 pressure control valve 106. As shown in FIG. 5, the C1 pressure control valve 106 includes a spring SP, an input port Pi, a drain port Pex, an output port Po, a diameter difference port Pd, a first oil chamber Pr1 and a second oil chamber Pr2. The output port Po alternatively communicates with the input port Pi or the drain port Pex. The C1 pressure control valve 106 is formed of a well-known spool valve. The C1 pressure control valve 106 includes a spool valve element SV inside a valve body. The spool valve element SV is accommodated so as to be slidable with a predetermined movable stroke, and is urged in one direction by the spring SP. The C1 pressure control valve 106 communicates the input port Pi with the output port Po or communicates the drain port Pex with the output port Po as the spool valve element SV is moved to one end or the other end of the slidable stroke. An oil passage Lsl1 through which the SL1 pressure Psl1 is supplied to the C1 electromagnetic valve SL1 is connected to the input port Pi and the diameter difference port Pd. A drain oil passage Lex is connected to the drain port Pex. An oil passage Lc1 that supplies the C1 pressure Pc1 is connected to the output port Po. An oil passage Lsl2 through which the SL2 pressure Psl2 is supplied from the C2 electromagnetic valve SL2 is connected to the first oil chamber Pr1. An oil passage Llpm through which modulator pressure Plpm is supplied from a modulator valve LPM is connected to the second oil chamber Pr2. The modulator pressure Plpm that is output from the modulator valve LPM is a predetermined constant pressure. The modulator pressure Plpm is supplied as, for example, the source pressure of the C1 electromagnetic valve SL1 that regulates the SL1 pressure Psl1 and the source pressure of the C2 electromagnetic valve SL2 that regulates the SL2 pressure Psl2.

The structure of each of the forward clutch C1 and the CVT drive clutch C2, shown in FIG. 5, is simplified. The forward clutch C1 will be described. The forward clutch C1 includes a friction engagement element 120, a piston 122 and a spring 124 between a pair of rotating members. The piston 122 is used to press the friction engagement element 120. The spring 124 urges the piston 122 away from the friction engagement element 120. As hydraulic oil is supplied through the oil passage Lc1 into a hydraulic pressure chamber 126 defined inside the forward clutch C1, the piston 122 is moved toward the friction engagement element 120 against the urging force of the spring 124, and the piston 122 presses the friction engagement element 120. At this time, the forward clutch C1 is engaged in a slipping state or completely engaged. The forward clutch C1 shown in FIG. 5 is in a state just before the piston 122 presses the friction engagement element 120.

The CVT drive clutch C2 will be described. The CVT drive clutch C2 includes a friction engagement element 130, a piston 132 and a spring 134 between a pair of rotating members. The piston 132 is used to press the friction engagement element 130. The spring 134 urges the piston 132 away from the friction engagement element 130. As hydraulic oil is supplied into a hydraulic pressure chamber 136 defined inside the CVT drive clutch C2, the piston 132 is moved toward the friction engagement element 130 against the urging force of the spring 134, and the piston 132 presses the friction engagement element 130. At this time, the CVT drive clutch C2 is engaged in a slipping state or completely engaged. The CVT drive clutch C2 shown in FIG. 5 is a state (released state) where the piston 132 has been moved to a position away from the friction engagement element 130 by the urging force of the spring 134.

The thus configured C1 pressure control valve 106 is alternatively switched between a normal valve position (see Normal-side valve position in FIG. 5) and a fail-safe valve position (see Failsafe-side valve position in FIG. 5) on the basis of the SL1 pressure Psl1, the SL2 pressure Psl2, the modulator pressure Plpm and the spring SP. At the normal valve position, the oil passage Lsl1 and the oil passage Lc1 are connected to each other. At the fail-safe valve position, the drain oil passage Lex and the oil passage Lc1 are connected to each other.

In the C1 pressure control valve 106, the spring SP provides urging force for holding the spool valve element SV at the normal valve position (Normal). The SL1 pressure Psl1 and the SL2 pressure Psl2 provide thrust for moving the spool valve element SV to the fail-safe valve position (Failsafe) against the urging force of the spring SP. The modulator pressure Plpm provides thrust in the same direction as the urging force of the spring SP. That is, the modulator pressure Plpm provides thrust for moving the spool valve element SV to the normal valve position (Normal).

In the C1 pressure control valve 106, when a force that moves the spool valve element SV to the normal valve position (Normal) based on the modulator pressure Plpm and the spring SP is larger than a force that moves the spool valve element SV to the fail-safe valve position (Failsafe) based on the SL1 pressure Psl1 and the SL2 pressure Psl2, the spool valve element SV is moved to the normal valve position (Normal). On the other hand, when a force that moves the spool valve element SV to the fail-safe valve position (Failsafe) based on the SL1 pressure Psl1 and the SL2 pressure Psl2 is larger than a force that moves the spool valve element SV to the normal valve position (Normal) based on the modulator pressure Plpm and the spring SP, the spool valve element SV is moved to the fail-safe valve position (Failsafe).

Specifically, when the spool valve element SV is moved to the normal valve position (Normal) (during normal times), the following mathematical expression (1) holds. In the mathematical expression (1), S1 denotes a pressure receiving area on which the SL1 pressure Psl1 is received, S2 denotes a pressure receiving area on which the SL2 pressure Psl2 is received, and S3 denotes a pressure receiving area on which the modulator pressure Plpm is received. A denotes the urging force (elastic return force) of the spring SP. On the other hand, when the spool valve element SV is moved to the fail-safe valve position (Failsafe) (in the event of failure), the following mathematical expression (2) holds.

$$S1 \times Psl1 + S2 \times Psl2 < S3 \times Plpm + A \tag{1}$$

$$S1 \times Psl1 + S2 \times Psl2 \geq S3 \times Plpm + A \tag{2}$$

For example, when the output of the SL1 pressure Psl1 for engaging the forward clutch C1 overlaps with the output of the SL2 pressure Psl2 due to a failure of the C2 electromagnetic valve SL2, the mathematical expression (2) holds, and the C1 pressure control valve 106 is switched to the fail-safe valve position (Failsafe). Similarly, when the output of the SL2 pressure Psl2 for engaging the CVT drive clutch C2 overlaps with the output of the SL1 pressure Psl1 due to a failure of the C1 electromagnetic valve SL1 as well, the mathematical expression (2) holds, and the C1 pressure control valve 106 is switched to the fail-safe valve position (Failsafe). Thus, when the oil passage Lc1 is connected to the drain oil passage Lex, the C1 pressure Pc1 (SL1 pressure Psl1) is not supplied to the forward clutch C1, and the forward clutch C1 is released, so the first power transmission path is placed in a power transmission interrupted state. Thus, simultaneous engagement of the forward clutch C1 and the CVT drive clutch C2 is avoided, so a tie-up of the power transmission device 16 resulting from establishment of both the second power transmission path and the first power transmission path is avoided.

Referring back to FIG. 3, the electronic control unit 80 functionally includes engine output control means, that is, an engine output control unit 112, shift control means, that is, a shift control unit 114, and elapsed time determination means, that is, an elapsed time determination unit 116.

The engine output control unit 112, for example, calculates a required output Pdem by applying an accelerator operation amount θacc and a vehicle speed V to a correlation (for example, driving force map) obtained empirically or by design and stored in advance (that is, determined in advance), sets a target engine torque Tetgt by which the required output Pdem is obtained, and outputs the engine output control command signal Se for controlling the output of the engine 12 to the throttle actuator, the fuel injection device, the ignition device, and the like, such that the target engine torque Tetgt is obtained.

In the CVT drive mode, the shift control unit 114 outputs the hydraulic control command signal Scvt for controlling the gear ratio γ of the continuously variable transmission 24 to the hydraulic control circuit 96 such that a target gear ratio γtgt that is calculated on the basis of an accelerator operation amount θacc, a vehicle speed V, a brake on signal Bon, and the like. Specifically, the shift control unit 114 stores a predetermined correlation (for example, a CVT shift map) for achieving the target gear ratio γtgt of the continuously variable transmission 24 at which the operating point of the engine 12 is on a predetermined optimal line (for example, engine optimal fuel consumption line) while adjusting the belt clamping pressures of the continuously variable transmission 24 to optimal values. The shift control unit 114 determines a primary command pressure Pintgt and a secondary command pressure Pouttgt on the basis of an accelerator operation amount θacc, a vehicle speed V, and the like, by consulting the correlation, and outputs the primary command pressure Pintgt and the secondary command pressure Pouttgt to the hydraulic control circuit 96, thus carrying out CVT shift. The primary command pressure Pintgt serves as a command value of the primary pressure Pin that is supplied to the hydraulic actuator 58c. The secondary command pressure Pouttgt serves as a command value of the secondary pressure Pout that is supplied to the hydraulic actuator 62c.

The shift control unit 114 executes change control for changing the driving pattern between the gear drive mode and the CVT drive mode. In the gear drive mode, the power of the engine 12 is transmitted to the output shaft 30 via the first power transmission mechanism 43. In the CVT drive mode, the power of the engine 12 is transmitted to the output shaft 30 via the second power transmission mechanism 41. Specifically, the shift control unit 114 determines whether to change the driving pattern while the vehicle is traveling. For example, the shift control unit 114 determines to shift (change the gear ratio) on the basis of a vehicle speed V and an accelerator operation amount θacc by referencing an upshift line and a downshift line in a shift map (change map) for changing the gear ratio γ between the first-speed gear ratio γ1 corresponding to the gear ratio EL in the gear drive mode and the second-speed gear ratio γ2 corresponding to the lowest gear ratio γmax in the CVT drive mode, and determines whether to change the driving pattern while the vehicle is traveling on the basis of the determined result. The upshift line and the downshift line are predetermined shift lines, and have a predetermined hysteresis.

When the shift control unit 114 determines to change the driving pattern, the shift control unit 114 changes the driving pattern. For example, when the shift control unit 114 determines to upshift in the gear drive mode, the shift control unit 114 changes the driving pattern from the gear drive mode to the CVT drive mode (high vehicle speed). When the shift control unit 114 changes the driving pattern from the gear drive mode to the CVT drive mode (high vehicle speed), the shift control unit 114 initially carries out upshift through C-to-C shift for releasing the forward clutch C1 and engaging the CVT drive clutch C2. This state corresponds to the CVT drive mode (intermediate vehicle speed) to which the driving pattern is transitionally changed in FIG. 2. The power transmission path in the power transmission device 16 is changed from the first power transmission path that transmits power via the first power transmission mechanism 43 to the second power transmission path that transmits power via the second power transmission mechanism 41. Subsequently, the shift control unit 114 changes the driving pattern to the CVT drive mode (high vehicle speed) by outputting a command to operate the hub sleeve 54 of the synchromesh mechanism S1 such that the engaged dog clutch D1 is released. The hub sleeve 54 is driven by the hydraulic actuator 100, and pressing force that acts on the hub sleeve 54 by hydraulic pressure that is supplied to the hydraulic actuator 100 is adjusted.

When the shift control unit 114 determines to downshift in the CVT drive mode (high vehicle speed), the shift control unit 114 changes the driving pattern from the CVT drive mode (high vehicle speed) to the gear drive mode. When the shift control unit 114 changes the driving pattern from the CVT drive mode (high vehicle speed) to the gear drive mode, the shift control unit 114 initially changes the driving pattern to the CVT drive mode (intermediate vehicle speed) by outputting a command to operate the hub sleeve 54 of the synchromesh mechanism S1 such that the released dog clutch D1 is engaged. Subsequently, the shift control unit 114 carries out downshift through C-to-C shift for releasing the CVT drive clutch C2 and engaging the forward clutch C1. This state corresponds to the gear drive mode shown in FIG. 2. The power transmission path in the power transmission device 16 is changed from the second power transmission path that transmits power via the second power transmission mechanism 41 to the first power transmission path that transmits power via the first power transmission mechanism 43. In this way, when the shift control unit 114 changes power transmission from power transmission via the second power transmission mechanism 41 (continuously variable transmission 24) to power transmission via the first power transmission mechanism 43 (gear mechanism 28, and the like) while the vehicle 10 is traveling, the shift control unit 114 operates the dog clutch D1 to an engaging side and then releases the CVT drive clutch C2.

Incidentally, for example, when it is determined to change the driving pattern to the gear drive mode that transmits power via the first power transmission mechanism 43 while the vehicle 10 is traveling in the CVT drive mode that transmits power via the second power transmission mechanism 41, C-to-C shift for releasing the CVT drive clutch C2 and engaging the forward clutch C1 is carried out. At this time, inertia torque caused by a variation in the rotation of the gear mechanism 28, and the like, that constitute the first power transmission mechanism 43 resulting from C-to-C shift is input to the continuously variable transmission 24, so torque fluctuations occur. In order to reduce belt slip due to the torque fluctuations, conventionally, simultaneously with the start of C-to-C shift, pressure increasing control for increasing the primary pressure Pin of the hydraulic actuator 58c and the secondary pressure Pout of the hydraulic actuator 62c in the continuously variable transmission 24 is executed. However, if the C-to-C shift and pressure increasing control for the belt-type continuously variable transmission 24 are simultaneously started, an increase in the hydraulic pressure of the engaging-side clutch to be engaged at the time of the C-to-C shift and an increase in the hydraulic pressure of each of the hydraulic actuators 58c, 62c of the continuously variable transmission 24 occur at the same time. Therefore, a required flow rate increases in the hydraulic control circuit 96, with the result that an insufficient flow rate may occur. As a result, hydraulic pressures required of the hydraulic actuators 58c, 62c of the continuously variable transmission 24 cannot be ensured, with the result that belt slip may occur.

In the present embodiment, even when the output of the SL1 pressure Psl1 and the output of the SL2 pressure Psl2 overlap with each other, the C1 pressure control valve 106 for avoiding simultaneous engagement of the forward clutch C1 and the CVT drive clutch C2 is provided. If an insufficient flow rate occurs in the hydraulic control circuit 96, the modulator pressure Plpm that is supplied as the source pressure for various valves decreases. As a result, the above-described mathematical expression (2) holds, and the C1 pressure control valve 106 switches to the fail-safe valve position (Failsafe), with the result that supply of hydraulic pressure to the forward clutch C1 may be interrupted. The shift control unit 114 executes control as described below at the time of carrying out C-to-C shift for changing the driving pattern. Thus, occurrence of an insufficient flow rate (insufficient hydraulic pressure) is suppressed, and belt slip of the continuously variable transmission 24 and unintended switching of the C1 pressure control valve 106 are reduced.

Referring back to FIG. 3, when the shift control unit 114 determines to change the driving pattern from the CVT drive mode to the gear drive mode or change the driving pattern from the gear drive mode to the CVT drive mode on the basis of the preset shift map, the shift control unit 114 starts C-to-C shift (that is, control for engaging the engaging-side clutch and control for releasing the releasing-side clutch) in advance of pressure increasing control over the continuously variable transmission 24. As the C-to-C shift is carried out, inertia torque resulting from the C-to-C shift is input to the continuously variable transmission 24 and reduces occurrence of belt slip. For this reason, when the C-to-C shift is required, pressure increasing control over the continuously variable transmission 24 is required.

When it is determined to start the C-to-C shift, the elapsed time determination unit 116 starts measuring an elapsed time T from the point in time at which the C-to-C shift is started, and determines whether the elapsed time T has reached a predetermined time T1 set in advance. The predetermined time T1 is obtained by experiment or analysis in advance, and is set to a time required for a piston that constitutes the engaging-side clutch (the forward clutch C1 or the CVT drive clutch C2) to be engaged at the time of the C-to-C shift is displaced up to a position just before the piston presses the friction engagement element that similarly constitutes the engaging-side clutch. That is, the predetermined time T1 is set to a time by which it is determined that the piston has reached the position (hereinafter, referred to as packing position) just before the piston presses the friction engagement element. Since the moving speed of the piston varies depending on, for example, the oil temperature Toil of hydraulic oil, the predetermined time T1 is set where necessary by using, for example, a relational expression or relational map obtained in advance for obtaining the predetermined time T1 with the oil temperature Toil as a parameter. The forward clutch C1 and the CVT drive clutch C2, one of which corresponds to the engaging-side clutch, have different structures, so a time required for the corresponding piston to reach the packing position also varies. Therefore, the predetermined time T1 is set for each engaging-side clutch to be engaged at the time of C-to-C shift.

When the elapsed time determination unit 116 determines that the predetermined time T1 has elapsed from the start of the C-to-C shift, the shift control unit 114 starts pressure increasing control over the continuously variable transmission 24 in order to reduce belt slip. That is, the shift control unit 114 starts pressure increasing control before the inertia phase resulting from the C-to-C shift begins. Therefore, when the inertia phase begins as a result of the C-to-C shift, inertia torque caused by a variation in the rotation of the gear mechanism 28, and the like, that constitute the first power transmission mechanism 43 is generated, and the inertia torque is input to the continuously variable transmission 24 side, so torque fluctuations occur. However, since the belt clamping pressures (the primary pressure Pin and the secondary pressure Pout) are increased in advance through pressure increasing control over the continuously variable transmission 24, belt slip is reduced.

An increasing amount α of the primary pressure Pin and an increasing amount β of the secondary pressure Pout in the continuously variable transmission 24 are set in advance on the basis of experiment or analysis, and are set to values at which belt slip due to torque fluctuations that occur as a result of input of inertia torque to the continuously variable transmission 24 is reduced. For example, an increasing amount map for obtaining the increasing amounts α, β, which is composed of an engine torque Te, a vehicle speed V, an oil temperature Toil of hydraulic oil, and the like, is obtained in advance, and the increasing amounts α, β are obtained by consulting the increasing amount map by using an actual engine torque Te, an actual vehicle speed V and an actual oil temperature Toil. Alternatively, for example, any one of an increasing amount map for obtaining the increasing amount α of the primary pressure Pin or an increasing amount map for obtaining the increasing amount β of the secondary pressure Pout may be obtained, and the other one of the increasing amounts may be calculated where necessary on the basis of the increasing amount obtained by using the increasing amount map such that the speed ratio γ of the continuously variable transmission 24 is kept. An increasing amount map is set for each of an upshift for changing the driving pattern from the gear drive mode to the CVT drive mode and a downshift for changing the driving pattern from the CVT drive mode to the gear drive mode.

For example, when C-to-C shift (downshift) for changing the driving pattern from the CVT drive mode in which power is transmitted via the second power transmission mechanism 41 to the gear drive mode in which power is transmitted via the first power transmission mechanism 43 is carried out, the CVT drive clutch C2 is released and the forward clutch C1 (engaging-side clutch) is engaged at the time of the C-to-C shift. When the inertia phase begins after a lapse of the predetermined time T1 from the start of the C-to-C shift, inertia torque caused by a variation in the rotation of the gear mechanism 28, and the like, is generated, and the inertia torque is input to the continuously variable transmission 24, so torque fluctuations occur. However, since the belt clamping pressures of the continuously variable transmission 24 are increased in advance through pressure increasing control over the continuously variable transmission 24, belt slip is reduced. In the C-to-C shift for changing the driving pattern from the CVT drive mode to the gear drive mode, torque that is transmitted to the continuously variable transmission 24 reduces with a lapse of time, and belt clamping pressures decrease as a whole during the transition of the C-to-C shift. However, the belt clamping pressures are relatively increased by the increasing amounts α, β in consideration of torque fluctuations due to inertia torque for the decrease in the belt clamping pressures in comparison with the case where no pressure increasing control is executed.

When C-to-C shift (upshift) for changing the driving pattern from the gear drive mode in which power is transmitted via the first power transmission mechanism 43 to the CVT drive mode in which power is transmitted via the second power transmission mechanism 41, the forward clutch C1 is released and the CVT drive clutch C2 (engaging-side clutch) is engaged at the time of the C-to-C shift. When the inertia phase begins after a lapse of the predetermined time T1 from the start of the C-to-C shift, inertia torque caused by a variation in the rotation of the gear mechanism 28, and the like, is generated, and the inertia torque is input to the continuously variable transmission 24. However, since the belt clamping pressures of the continuously variable transmission 24 are increased in advance through pressure increasing control over the continuously variable transmission 24, belt slip is reduced. In the C-to-C shift for changing the driving pattern from the gear drive mode to the CVT drive mode, torque that is transmitted to the continuously variable transmission 24 increases with a lapse of time, and belt clamping pressures increase as a whole during the transition of the C-to-C shift. However, the belt clamping pressures are further increased by the increasing amounts α, β in consideration of torque fluctuations due to inertia torque for the increase in the belt clamping pressures in comparison with the case where no pressure increasing control is executed.

As described above, as the predetermined time T1 elapses after the C-to-C shift has been started, pressure increasing control over the continuously variable transmission 24 is started. Since no inertia torque is input to the continuously variable transmission 24 until the inertia phase of the C-to-C shift begins, belt slip is less likely to occur even when pressure increasing control over the continuously variable transmission 24 is not started simultaneously with the start of the C-to-C shift. On the other hand, in the engaging-side clutch, the piston needs to be quickly displaced, and, for example, quick filling for temporarily raising a command pressure at the time of the start of the shift is carried out. Thus, a required amount of hydraulic oil also increases. In contrast, since pressure increasing control over the continuously variable transmission 24 is not started before the piston reaches the packing position, no hydraulic oil is consumed at the continuously variable transmission 24 side, and a decrease in hydraulic pressure due to an insufficient amount of hydraulic oil is also less likely to occur. Therefore, the modulator pressure Plpm does not decrease, and switching of the C1 pressure control valve 106 to the fail-safe valve position (Failsafe) is also avoided with a decrease in the modulator pressure lpm.

As the piston reaches the packing position, pressure increasing control over the continuously variable transmission 24 is started. At this time, hydraulic oil is consumed in the continuously variable transmission 24; however, since the piston is moved to the packing position in the engaging-side clutch, the amount of hydraulic oil consumed is smaller than that at the time of the start of the shift. Therefore, even when pressure increasing control over the continuously variable transmission 24 is started, an insufficient amount of hydraulic oil is less likely to occur, so belt slip due to a decrease in the belt clamping pressures is also less likely to occur. A decrease in the modulator pressure Plpm is also suppressed.

When the shift control unit 114 determines the end of the inertia phase, the shift control unit 114 ends the C-to-C shift. At the same time, when the shift control unit 114 determines the end of the inertia phase, the shift control unit 114 ends pressure increasing control over the continuously variable transmission 24. That is, hydraulic pressure is controlled by setting the primary pressure Pin and the secondary pressure Pout before pressure increasing control as targets. The end of the inertia phase is, for example, determined on the basis of whether the input shaft rotation speed Nin has reached a rotation speed that is set after the C-to-C shift (that is, whether a variation in the rotation of the input shaft rotation speed Nin has ended). Alternatively, it is determined whether a variation amount of the input shaft rotation speed Nin becomes smaller than a threshold set in advance.

Figure 6:
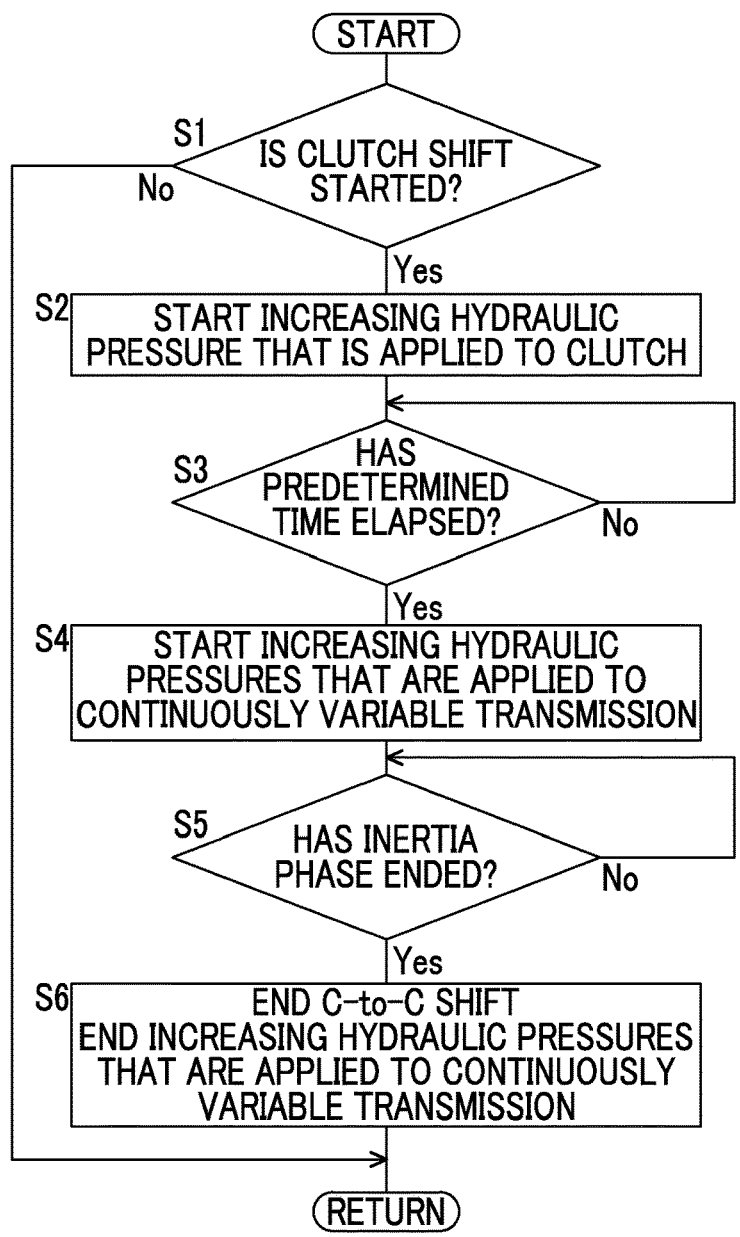
FIG. 6 is a flowchart that illustrates a relevant portion of control operations of an electronic control unit shown in FIG. 3, specifically, control operations for reducing belt slip that occurs during execution of step shift for changing the driving pattern.

FIG. 6 is a flowchart that illustrates a relevant portion of control operations of the electronic control unit 80, specifically, control operations for reducing belt slip that occurs during execution of stepped shift for changing the driving pattern. This flowchart is repeatedly executed while the vehicle is traveling.

Initially, in step S1 (hereinafter, step is omitted) corresponding to the function of the shift control unit 114, it is determined whether stepped shift (C-to-C shift) associated with a change of the driving pattern is started. When it is not determined to start the C-to-C shift, negative determination is made in SI, after which the routine is ended. When it is determined to start the C-to-C shift, affirmative determination is made in S1, and the process proceeds to S2. In S2 corresponding to the function of the shift control unit 114, the C-to-C shift is started, and an increase in pressure that is applied to the engaging-side clutch is started. In S3 corresponding to the function of the elapsed time determination unit 116, it is determined whether the elapsed time T from the start of the C-to-C shift has reached the predetermined time T1. When the elapsed time T has not reached the predetermined time T1, negative determination is made in S3, and S3 is executed again. That is, until the elapsed time T reaches the predetermined time T1, S3 is repeatedly executed. When the elapsed time T reaches the predetermined time T1, affirmative determination is made in S3, and the process proceeds to S4.

In S4 corresponding to the function of the shift control unit 114, pressure increasing control over the continuously variable transmission 24 is started. In S5 corresponding to the function of the shift control unit 114, it is determined whether the inertia phase of the C-to-C shift has ended. Negative determination is made in S5 when the inertia phase has not ended. Until affirmative determination is made in S5, pressure increasing control over the continuously variable transmission 24 is continued. When it is determined that the inertia phase of the C-to-C shift has ended, affirmative determination is made in S5, and the process proceeds to S6. In S6 corresponding to the function of the shift control unit 114, the C-to-C shift is ended, and pressure increasing control over the continuously variable transmission 24 is ended.

Figure 7:
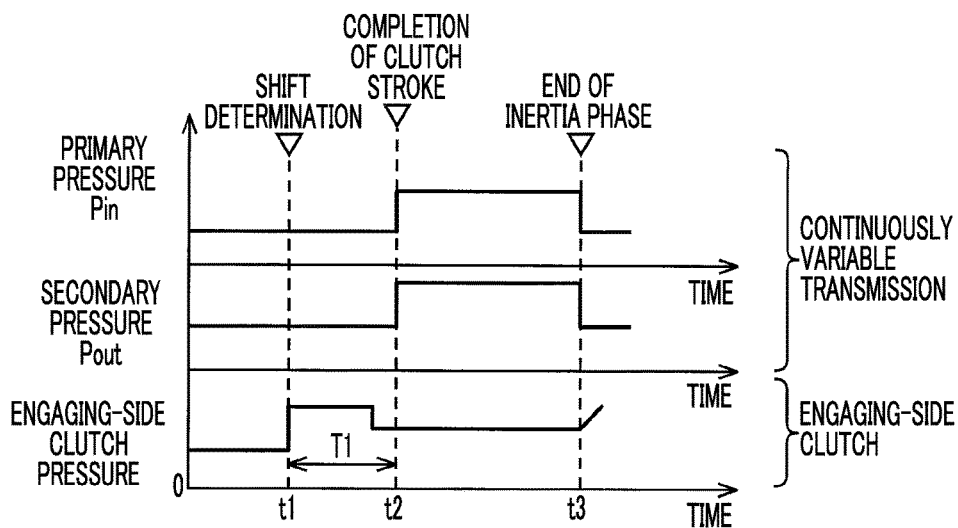
FIG. 7 is a timing chart that shows a vehicle behavior based on the control operations that are executed by the electronic control unit shown in FIG. 3.
Figure 8:
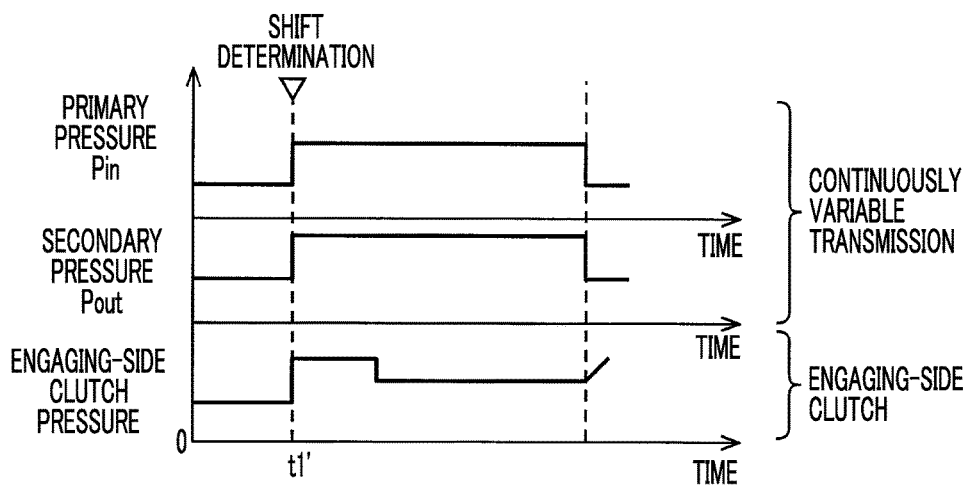
FIG. 8 is a timing chart that shows a vehicle behavior based on existing control.

FIG. 7 is a timing chart that shows a vehicle behavior based on the control operations that are executed by the electronic control unit 80 at the time of changing the driving pattern. FIG. 8 is a timing chart that shows a vehicle behavior based on existing control. In each of FIG. 7 and FIG. 8, the abscissa axis represents time, and the ordinate axes respectively represent the primary pressure Pin, the secondary pressure Pout and the engaging-side clutch pressure of the engaging-side clutch (the forward clutch C1 or the CVT drive clutch C2) that is engaged at the time of C-to-C shift in order from the top. Each of the primary pressure Pin, the secondary pressure Pout and the clutch pressure in FIG. 7 and FIG. 8 shows a command pressure. As for the primary pressure Pin and the secondary pressure Pout, only the increasing amount of pressure through pressure increasing control is shown.

When it is determined to start C-to-C shift at time t1 in FIG. 7, the engaging-side clutch pressure of the engaging-side clutch is increased to a predetermined value. The reason why the clutch pressure (command pressure) is temporarily steeply increased is to quickly move the piston to the packing position (quick filling) by advancing the rising of the actual clutch pressure. At this time, the amount of hydraulic oil that is consumed in the engaging-side clutch increases. In contrast, at time t1, pressure increasing control over the primary pressure Pin and the secondary pressure Pout in the continuously variable transmission 24 is not started. Therefore, an insufficient flow rate of hydraulic oil is suppressed in the hydraulic control circuit 96. Until the piston moves to the packing position, the inertia phase does not begin, and inertia torque that is generated during the inertia phase is not input to the continuously variable transmission 24, so belt slip is less likely to occur even when pressure increasing control is not started at time t1.

At time t2 after a lapse of the predetermined time T1 from time t1, pressure increasing control over the primary pressure Pin and the secondary pressure Pout is started in order to reduce belt slip. The inertia phase begins from time t2; however, the piston of the engaging-side clutch has been already pressing the friction engagement element, and the amount of hydraulic pressure consumed in the engaging-side clutch is smaller than that at the time of the start of movement of the piston, so an insufficient flow rate is less likely to occur even when pressure increasing control over the continuously variable transmission 24 is started. Therefore, belt slip resulting from the fact that the primary pressure Pin and the secondary pressure Pout do not increase to target hydraulic pressures due to an insufficient flow rate is less likely to occur. The modulator pressure Plpm does not decrease due to an insufficient flow rate, and switching of the C1 pressure control valve 106 to the fail-safe valve position (Failsafe) due to a decrease in the modulator pressure Plpm is also prevented.

At time t3, when the end of the inertia phase of the C-to-C shift is determined, pressure increasing control over the continuously variable transmission 24 is ended, and the primary pressure Pin and the secondary pressure Pout are decreased to hydraulic pressures before pressure increasing control.

On the other hand, in existing control, as shown in FIG. 8, pressure increasing control over the continuously variable transmission 24 is started simultaneously with the start of C-to-C shift at time t1'. However, since the flow rate of hydraulic oil consumed is large in both the engaging-side clutch and the continuously variable transmission 24, an insufficient flow rate of hydraulic oil tends to occur. Therefore, it is difficult to generate a required hydraulic pressure, and belt slip due to a decrease in hydraulic pressure or unintended switching of the C1 pressure control valve 106 may occur.

As described above, according to the present embodiment, the timing of starting engagement control (pressure increasing control) over the engaging-side clutch and the timing of starting pressure increasing control over the continuously variable transmission 24 do not completely overlap with each other. Therefore, consumption of a large amount of hydraulic oil at a time is prevented. As a result, it is possible to suppress a decrease in hydraulic pressure due to an insufficient flow rate of hydraulic oil. Pressure increasing control over the continuously variable transmission 24 is started after a lapse of the predetermined time T1; however, since engagement control over the engaging-side clutch is already being executed, consumed flow rate is smaller as compared to the case where engagement control over the engaging-side clutch and pressure increasing control over the continuously variable transmission 24 are started at the same time. Therefore, it is possible to ensure hydraulic pressure that is required at the time of pressure increasing control over the continuously variable transmission 24, so it is possible to reduce belt slip of the continuously variable transmission 24 due to a decrease in hydraulic pressure.

According to the present embodiment, when the power transmission path is changed by the forward clutch C1 and the CVT drive clutch C2 between power transmission via the first power transmission mechanism 43 (the forward/reverse switching device 26, the gear mechanism 28, and the like) and power transmission via the second power transmission mechanism 41 (the continuously variable transmission 24), pressure increasing control over the continuously variable transmission 24 is started after a lapse of the predetermined time T1 from the start of the C-to-C shift. Therefore, the start of pressure increasing control over the continuously variable transmission 24 and the start of engagement control over the engaging-side clutch do not overlap with each other. As a result, occurrence of an insufficient flow rate of hydraulic oil is prevented, and a decrease in hydraulic pressure due to an insufficient flow rate is suppressed at the time of pressure increasing control over the continuously variable transmission 24.

According to the present embodiment, a flow rate that is required to quickly move the piston to a position just before the piston presses the engagement element increases at the initial stage of the start of engagement control over the engaging-side clutch; however, pressure increasing control over the continuously variable transmission 24 is not started at this time, so an insufficient flow rate of hydraulic oil is suppressed. In addition, the piston does not press the engagement element before the predetermined time T1 elapses, so inertia torque caused by a variation in the rotation of the gear mechanism 28, and the like, through engagement control over the engaging-side clutch is not input to the continuously variable transmission 24. Therefore, even when pressure increasing control over the continuously variable transmission 24 is not executed until a lapse of the predetermined time T1, torque fluctuations resulting from input of inertia torque to the continuously variable transmission 24 do not occur, so there is no concern about belt slip. On the other hand, pressure increasing control over the continuously variable transmission 24 is started after a lapse of the predetermined time T1; however, this does not overlap with the start of engagement control over the engaging-side clutch, so an insufficient flow rate is also less likely to occur. Therefore, at the time of pressure increasing control over the continuously variable transmission 24, a decrease in hydraulic pressure due to an insufficient flow rate is suppressed.

According to the present embodiment, when a variation in the rotation of the gear mechanism 28, and the like, associated with engagement control over the engaging-side clutch ends, inertia torque caused by a variation in rotation is not input to the continuously variable transmission 24. Therefore, when a variation in the rotation of the gear mechanism 28, and the like, ends, unnecessary supply of hydraulic pressure is eliminated by ending pressure increasing control over the continuously variable transmission 24, so fuel consumption improves.

The embodiment of the present disclosure is described in detail with reference to the accompanying drawings; however, the present disclosure is also applied to other embodiments.

For example, in the above-described embodiment, the first power transmission mechanism 43 including the forward/reverse switching device 26, the gear mechanism 28, and the like, has a forward one-speed gear ratio. Instead, the first power transmission mechanism 43 may be configured to be able to shift into a plurality of speed positions. That is, the first power transmission mechanism 43 is not specifically limited as long as the first power transmission mechanism 43 includes an engaging device that is controlled by hydraulic pressure.

In the above-described embodiment, the forward clutch C1 is provided in the forward/reverse switching device 26, and the CVT drive clutch C2 is provided between the secondary pulley 62 and the output shaft 30; however, the positions of the forward clutch C1 and CVT drive clutch C2 are not necessarily limited to these positions. That is, the positions of the forward clutch C1 and CVT drive clutch C2 may be modified as needed as long as the forward clutch C1 and the CVT drive clutch C2 are able to switch the transmission path into any one of power transmission via the first power transmission mechanism 43 and power transmission via the second power transmission mechanism 41.

The above-described embodiments are only illustrative. The present disclosure may be implemented in modes including various modifications or improvements on the basis of the knowledge of persons skilled in the art.

What is claimed is:

1. A control system for a vehicle transmission, the vehicle transmission including a first power transmission mechanism and a second power transmission mechanism that are provided in parallel with each other between a drive source and a drive wheel, the second power transmission mechanism including a continuously variable transmission that is controlled by hydraulic pressure, the vehicle transmission including at least one engaging device that is controlled by hydraulic pressure and that switches power transmission to power transmission via the first power transmission mechanism, the control system comprising:

an electronic control unit configured to, when control for engaging the at least one engaging device that switches power transmission to power transmission via the first power transmission mechanism and control for increasing hydraulic pressure that is applied to the continuously variable transmission are required, control the continuously variable transmission and the at least one engaging device so as to start control for engaging the at least one engaging device first and, after a lapse of a predetermined time from the start of control for engaging the at least one engaging device, start control for increasing hydraulic pressure that is applied to the continuously variable transmission.

2. The control system according to claim 1, wherein the at least one engaging device is configured to be able to switch power transmission between the drive source and the drive wheel to any one of power transmission via the first power transmission mechanism and power transmission via the second power transmission mechanism.

3. The control system according to claim 2, wherein:
the at least one engaging device includes a first engaging device and a second engaging device; and
the first engaging device and the second engaging device are configured to switch power transmission to power transmission via the first power transmission mechanism when the first engaging device is engaged and the second engaging device is released, and are configured to switch power transmission to power transmission via the second power transmission mechanism when the second engaging device is engaged and the first engaging device is released.

4. The control system according to claim 1, wherein:
the at least one engaging device each includes an engagement element and a piston that presses the engagement element; and
the predetermined time is set to a time corresponding to a time that is taken from the start of control for engaging the at least one engaging device to when the piston reaches a position just before the piston presses the engagement element.

5. The control system according to claim 1, wherein the electronic control unit is configured to, as a variation in rotation of the first power transmission mechanism resulting from control for engaging the at least one engaging device ends, end control for increasing hydraulic pressure that is applied to the continuously variable transmission.

* * * * *